(12) United States Patent
Nour et al.

(10) Patent No.: US 12,494,714 B1
(45) Date of Patent: Dec. 9, 2025

(54) REGULATED MULTI-STAGE POWER CONVERTER ARCHITECTURE

(71) Applicant: Lotus Microsystems ApS, Hvidovre (DK)

(72) Inventors: Yasser A. A. Nour, Copenhagen (DK); Jacob Elias Fæster Overgaard, Copenhagen (DK); Mohamed Ahmed Refaei Abdelrazik, Cairo (EG); Hoà Lê Thanh, Copenhagen (DK)

(73) Assignee: LOTUS MICROSYSTEMS APS, Hvidovre (DK)

( * ) Notice: Subject to any disclaimer, the term of this patent is extended or adjusted under 35 U.S.C. 154(b) by 0 days.

(21) Appl. No.: 19/172,876

(22) Filed: Apr. 8, 2025

(30) Foreign Application Priority Data

Jan. 10, 2025 (EP) ..................................... 25151364

(51) Int. Cl.
*H02M 3/158* (2006.01)
*H02M 1/00* (2006.01)
*H02M 3/00* (2006.01)
*H02M 3/07* (2006.01)
*H02M 3/335* (2006.01)

(52) U.S. Cl.
CPC ......... *H02M 3/158* (2013.01); *H02M 1/0045* (2021.05); *H02M 3/01* (2021.05); *H02M 3/07* (2013.01); *H02M 3/33569* (2013.01)

(58) Field of Classification Search
CPC ...... H02M 3/158; H02M 1/0045; H02M 3/01; H02M 3/07; H02M 3/33569
See application file for complete search history.

(56) References Cited

U.S. PATENT DOCUMENTS

2024/0014736 A1* 1/2024 Giuliano ............... H02M 3/073

* cited by examiner

*Primary Examiner* — Rafael O De Leon Domenech
(74) *Attorney, Agent, or Firm* — COATS & BENNETT, PLLC

(57) ABSTRACT

The present disclosure relates to a power converter comprising a first stage regulated DC-DC converter configured to convert an input DC voltage to an intermediate DC voltage; a second stage open-loop DC-DC converter configured to convert the intermediate DC voltage to an output DC voltage or an output DC current to a load; and a controller configured to control the regulated DC-DC converter to regulate the output DC voltage or the output DC current by adjusting the intermediate DC voltage, based on measurements of the output DC voltage or the output DC current and a target output DC voltage or a target output DC current. The disclosure further relates to the method of converting an input DC voltage to an output DC voltage or current using the two-stage DC-DC power converter architecture.

21 Claims, 9 Drawing Sheets

REGULATED MULTI-STAGE POWER CONVERTER ARCHITECTURE

This application claims priority to European Application No. 25151364.4, filed 10 Jan. 2025, disclosure of which is incorporated in its entirety by reference herein.

The present disclosure relates to a multi-stage DC-DC power converter architecture. The disclosure further relates to a method of converting an input DC voltage to an output DC voltage using the multi-stage DC-DC power converter architecture.

BACKGROUND

In modern electronic systems, efficient power conversion is a critical requirement, especially as the demand for compact, high-performance devices continues to grow. Power converters, particularly DC-DC converters, are widely used to convert a DC input voltage to a different DC output voltage, enabling the supply of power to various components within a system. Conventional DC-DC converters have been the cornerstone of power conversion technologies. These converters have proven reliable in many applications; however, they are often challenged by the need to balance efficiency, size, and thermal management, particularly in high-power density applications.

One of the significant drawbacks of traditional DC-DC converter architectures is the inherent trade-off between efficiency, size, and thermal performance. As electronic devices become more compact, the demand for converters with high power density and low power loss increases. However, conventional architectures often struggle to achieve this balance, especially under varying input and output conditions. This can lead to increased power losses, higher heat generation, and reduced overall system efficiency, particularly in high-current applications or where space constraints are critical.

Moreover, the need for precise voltage regulation across different operating conditions adds further complexity to the design and implementation of these converters. As systems require ever-tighter regulation of voltage levels, particularly in sensitive applications, traditional power converters may fail to deliver the required performance without significantly increasing circuit complexity or component size. This results in a compromise between the reliability of power delivery and the efficiency of the system, posing a considerable challenge in the development of next-generation electronic systems.

It is therefore an objective of the present disclosure to provide a power conversion architecture that overcomes the limitations of existing DC-DC converters by improving efficiency, reducing component stress, and enhancing power density without compromising on size or thermal management. This objective is achieved through the introduction of a DC-DC power converter architecture designed to deliver improved overall system performance across a wide range of applications.

SUMMARY

The present disclosure relates to a power converter comprising a first stage regulated DC-DC converter configured to convert an input DC voltage to an intermediate DC voltage; a second stage open loop DC-DC converter configured to convert the intermediate DC voltage to an output DC voltage to a load; and a controller configured to control the regulated DC-DC converter to regulate the output voltage or an output current, thereby also adjusting the intermediate DC voltage based on measurements of the output DC voltage and a target output DC voltage.

The power converter described offers several technical advantages, particularly in terms of efficiency and power density. By dividing the power conversion process into two stages, the system, and/or the system designer can optimize the operation of each stage independently. The first stage, being regulated, allows precise control over the final output DC voltage or current and indirectly also the intermediate DC voltage, which has a fixed conversion ratio in relation to the final output DC voltage or current. This two-stage approach also reduces the stress on the components in the first stage, as the second stage handles the final conversion to the desired output voltage or current. The second stage, which operates in an open loop configuration, can achieve high efficiency due to its simplified design and optimization for certain fixed conversion rates.

The system is particularly advantageous in applications where space is limited, and high power density is required. The architecture allows for placing the second stage closer to the load, reducing losses associated with long interconnects and improving overall system performance. Preferably, the second stage can be directly integrated with the load, on the same chipset. The modular nature of the second stage, which can be configured with multiple sub-converters, provides flexibility in achieving various fixed conversion rates, thereby offering a versatile solution for different power conversion needs. The combination of a regulated first stage and a high-efficiency second stage results in a power converter that is both compact and capable of delivering precise voltage regulation under varying load conditions.

In certain embodiments, the first stage may be a linear regulator, a switched-mode converter, such as a switched-capacitor converter or a switched-inductor converter, or a resonant converter, while the second stage may include switched-capacitor converters or a solid-state transformer. In general, a switched-mode converter can be understood as a type of DC-DC converter that uses electronic switching elements (such as transistors or MOSFETs) to convert electrical power efficiently between different voltage levels. This flexibility in the choice of components allows the system to be tailored to specific application requirements, offering a balance between efficiency, size, and cost. The controller's ability to dynamically adjust the intermediate voltage further enhances the system's adaptability to different operating conditions, ensuring that the power converter maintains optimal performance across a wide range of scenarios.

The present disclosure further relates to a method of converting an input DC voltage to an output DC voltage, the method comprising the steps of providing a power converter comprising a first stage regulated DC-DC converter adapted to receive an input DC power and generate an intermediate DC voltage; a second stage open loop DC-DC converter adapted to receive the intermediate DC voltage from the first stage regulated DC-DC converter and generate an output DC voltage; and controlling the regulated DC-DC converter to adjust the intermediate DC voltage, thereby also adjusting the output DC voltage based on measurements of the output DC voltage and a target output DC voltage.

This method provides several technical benefits by leveraging the two-stage power conversion architecture. By separating the conversion process into two distinct stages, the method allows for precise control of the output DC voltage, and indirectly to the intermediate voltage, which leads to optimized performance of the second stage. The first stage's ability to regulate the intermediate voltage ensures that the second stage operates under favorable conditions, thereby enhancing the overall efficiency of the power conversion process. This division also allows each stage to be designed and optimized for specific functions, reducing the stress on components and improving the system's reliability.

The method is particularly effective in applications requiring high efficiency and compact designs. By controlling the intermediate voltage, the method ensures that the power converter can adapt to varying load conditions while maintaining stable and precise output. This adaptability is crucial in scenarios where the input voltage or load demand fluctuates, allowing the system to dynamically adjust and maintain optimal performance. The modular approach of the second stage, which can include multiple sub-converters, further enhances the system's flexibility, enabling it to meet different power conversion needs with high efficiency.

In some embodiments, the first stage may be implemented using a linear regulator, a switched-mode converter, or a resonant converter, while the second stage may utilize switched-capacitor converters or a solid-state transformer. The method's flexibility in component selection allows it to be tailored to various applications, providing a balance between efficiency, cost, and size. The ability to dynamically adjust the intermediate voltage based on real-time measurements of the output voltage ensures that the method can deliver consistent and reliable performance across a wide range of operating conditions, making it suitable for use in advanced electronic systems where power efficiency and density are critical.

DESCRIPTION OF DRAWINGS

The invention will in the following be described with reference to the accompanying drawings, which are examples and not limiting to the presently disclosed power converter and method of converting an input DC voltage to an output DC voltage.

DETAILED DESCRIPTION

Figure 1:
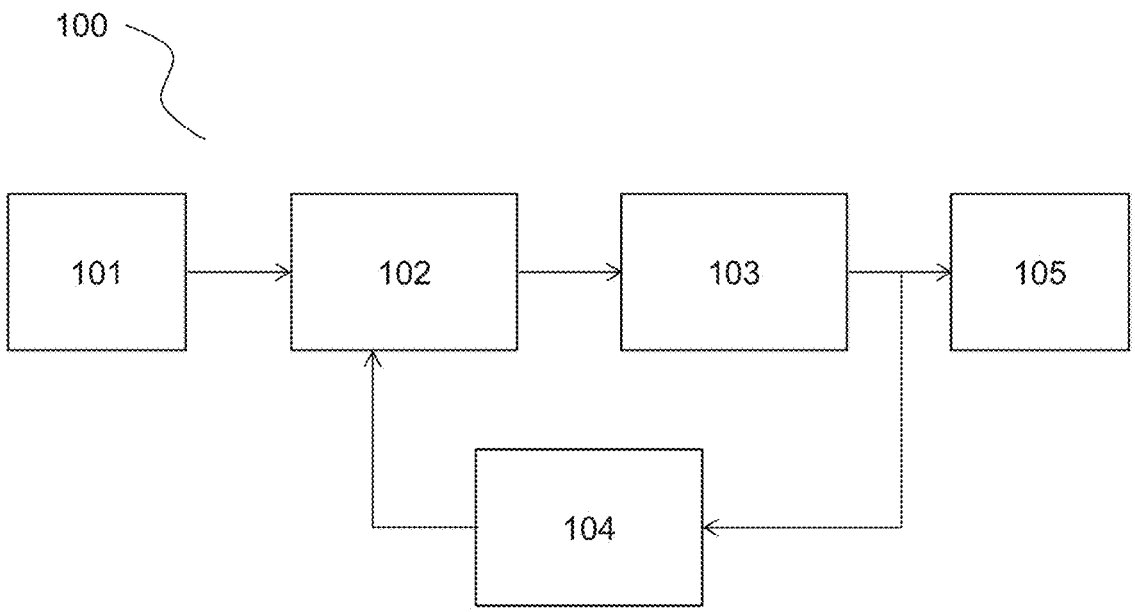
FIG. 1 shows one embodiment of the presently disclosed two-stage power converter architecture.

The present disclosure relates to a power converter comprising a first stage regulated DC-DC converter configured to convert an input DC voltage to an intermediate DC voltage and a second stage open loop DC-DC converter configured to convert the intermediate DC voltage to an output DC voltage to a load. A controller is used to regulate the regulated DC-DC converter based on measurements of the output DC voltage. The regulation may have a target output DC voltage, which may also be referred to as a reference output DC voltage. The controller may control the first stage regulated DC-DC converter to regulate the output DC voltage.

The input DC voltage may be received from an input source, such as an input power source, which could include various types of DC power supplies, such as a battery, an external DC power adapter, or a renewable energy source like a solar panel. The input source can be an input DC current source, thereby delivering an input DC current. The input source can be an input DC voltage source, thereby delivering an input DC voltage. In certain embodiments, the input source may additionally provide an input DC current, enabling the power converter to operate under a wide range of input conditions. This flexibility allows the system to accommodate both voltage and/or current input sources, depending on the specific requirements of the application.

As a person skilled in the art will realize, regulating the intermediate DC voltage will also implicitly regulate the output DC voltage since the second stage is an open loop DC-DC converter. In practice the process of regulating the output DC voltage will involve a measurement and feedback process.

The process of regulating the output DC voltage in the two-stage power converter architecture involves precise control of the first stage (the regulated DC-DC converter) to indirectly control the second stage (the open-loop DC-DC converter). The core mechanism of this regulation centers around the first stage's ability to adjust the intermediate DC voltage, which is then fed into the second stage to generate the output DC voltage. Since the second stage operates in an open-loop configuration, it does not perform active regulation itself but instead relies on the intermediate voltage provided by the first stage.

In one embodiment the regulation process starts by measuring the output DC voltage delivered to the load. Sensors or measurement circuits, such as voltage dividers and/or analog-to-digital converters (ADCs), may be used to monitor the actual output voltage continuously. This measured voltage may be compared to a reference or target output voltage, which represents the desired operating voltage for the load. The controller receives the real-time measurements of the output voltage and compares them to the target value. If there is any deviation—either due to changes in the input voltage, variations in load conditions, or other external factors—the controller calculates the required adjustment to bring the output voltage back within the acceptable range. This closed-loop feedback may be used to maintain stable output voltage despite external disturbances.

The first stage, being a regulated DC-DC converter, is responsible for adjusting the intermediate DC voltage based on the controller's feedback. The controller sends control signals to the first stage to either increase or decrease the intermediate voltage. For example, if the output voltage is too low (below the target), the controller increases the intermediate DC voltage by adjusting the duty cycle of the switching elements in a switched-mode converter or by increasing the output voltage in the case of a linear regulator or resonant converter.

In switched-mode converters, such as buck, boost, or buck-boost configurations, the controller modulates the duty cycle of the switching transistors. A higher duty cycle increases the energy transferred from the input to the intermediate voltage, raising the intermediate DC voltage. Conversely, if the output voltage is too high, the controller reduces the duty cycle, which lowers the intermediate voltage and, in turn, reduces the output voltage.

In a linear regulator, the control mechanism would involve adjusting the pass element (such as a transistor) to regulate the intermediate voltage more precisely. Although less efficient than a switched-mode converter, the linear regulator can provide very fine control over the intermediate voltage, ensuring highly stable output voltage regulation, particularly in noise-sensitive applications.

In a resonant converter, the controller can adjust the resonant frequency or phase angle to control the power transferred to the intermediate voltage. This method is particularly effective in high-frequency applications where the reduction of switching losses is important.

The second stage, being open-loop, does not perform active regulation. Instead, it converts the intermediate DC voltage to the final output voltage based on a fixed conversion ratio. For instance, if the second stage is implemented as a switched-capacitor voltage multiplier, it will multiply the intermediate voltage by a predetermined factor (e.g., $2x$ or $3x$) to generate the output voltage. Similarly, a switched-capacitor current multiplier will increase the current by a set multiple, depending on the configuration of the capacitors and switches.

Since the second stage does not dynamically adjust its conversion ratio, the responsibility for maintaining a stable output voltage lies with the first stage. The first stage must be controlled precisely to ensure that the intermediate voltage is appropriate for the desired output voltage. By fine-tuning the intermediate voltage, the controller ensures that the output voltage remains close to the target value.

One of the advantages of this two-stage architecture is its adaptability to varying input voltages and load conditions. When the input DC voltage fluctuates, the first stage can respond quickly to adjust the intermediate voltage, keeping the output voltage stable. For instance, if the input voltage drops suddenly, the controller detects the corresponding drop in the output voltage and increases the duty cycle or pass element adjustment in the first stage to boost the intermediate voltage. Similarly, if the load demands change—for example, if the load increases and more power is required—the controller can respond by increasing the intermediate voltage or boosting the current delivered by the first stage. This dynamic adjustment ensures that the power converter can handle varying conditions without compromising the output voltage stability.

In cases where the second stage comprises multiple parallel open-loop sub-converters, the controller can further optimize the output voltage by selectively enabling or disabling certain sub-converters. For example, when the load is light, the controller may deactivate some of the sub-converters to improve efficiency and reduce unnecessary power consumption. When the load increases, the controller can bring additional sub-converters online to provide more power.

In situations where the sub-converters have different fixed conversion rates, the controller can select the appropriate sub-converters to meet the output voltage requirements. This adds a layer of flexibility to the regulation process, allowing the system to handle a wide range of output voltages without requiring continuous adjustments to the intermediate voltage.

The controller may incorporate any suitable error compensation mechanism, such as proportional-integral-derivative (PID) control, to ensure that the regulation process is both stable and responsive. PID control allows the controller to correct any errors in the output voltage in a smooth and stable manner, avoiding overshoot or oscillation. The proportional component addresses the immediate error, the integral component corrects for accumulated error over time, and the derivative component helps anticipate future changes based on the rate of change of the error.

In more advanced implementations, the controller may also include predictive algorithms or adaptive control techniques to improve the responsiveness of the system, especially in applications where the load or input voltage changes rapidly.

In some cases, thermal monitoring can also be part of the regulation process, allowing the controller to adjust the power delivery based on the temperature of key components. If the temperature exceeds a certain threshold, the controller can reduce the intermediate voltage or deactivate certain sub-converters to prevent overheating.

In one embodiment of the present disclosure, the first stage regulated DC-DC converter may be a linear regulator, a switched-mode converter, or a resonant converter. The linear regulator is a type of voltage regulator that uses active devices, such as transistors or operational amplifiers, to maintain a constant output voltage regardless of changes in input voltage or load conditions. It operates by continuously adjusting the resistance in its pass element, thereby dissipating excess power as heat. While it offers excellent output voltage regulation and low noise, its efficiency is lower compared to other types of converters, particularly when there is a large difference between input and output voltages. This makes it suitable for applications where noise sensitivity and simplicity are critical, but less so for high-efficiency requirements.

The switched-mode converter, on the other hand, operates by rapidly switching on and off a series of electronic switches, typically transistors, to transfer energy from the input to the output in discrete packets. These converters, such as buck, boost, or buck-boost configurations, offer higher efficiency by reducing power loss in the switching elements and using inductors and capacitors to store and release energy efficiently. The switched-mode converter is well-suited for applications where high efficiency and compact size are necessary, such as in battery-powered devices or where thermal management is a concern.

A resonant converter is a specialized form of switched-mode converter that uses resonant circuits, typically consisting of inductors and capacitors, to shape the switching waveforms in a way that minimizes switching losses. This allows for operation at higher frequencies with reduced electromagnetic interference (EMI) and improved efficiency, making resonant converters ideal for high-frequency applications or where minimizing EMI is important. The choice between these options for the first stage regulated DC-DC converter depends on the specific application requirements, such as the desired balance between efficiency, size, noise, and complexity.

In one embodiment of the present disclosure, the second stage open loop DC-DC converter may be implemented as a switched-capacitor current multiplier or a switched-capacitor voltage multiplier. These converters do not rely on magnetic components such as inductors, making them compact and suitable for integration in environments where space is limited or where high-frequency operation is required. A switched-capacitor current multiplier works by transferring charge between capacitors in a way that effectively increases the current delivered to the load. This is particularly useful in applications where the load requires a higher current than what the first stage can provide directly.

The switched-capacitor voltage multiplier, on the other hand, increases the voltage by stacking the charge from multiple capacitors in series during the discharge phase. This allows the output voltage to be a multiple of the input or intermediate voltage, making it suitable for applications where a significant voltage increase is needed, such as in biasing circuits or sensor power supplies. Both types of switched-capacitor converters can be configured to achieve high efficiency by optimizing the switching frequency and capacitor sizing, which is particularly important in the open loop stage where the absence of feedback regulation means the converter must be inherently efficient to maintain overall system performance.

In one embodiment of the present disclosure, the second stage open loop DC-DC converter may be configured as a solid-state transformer. The solid-state transformer may be designed to perform DC-DC conversion. A solid-state transformer replaces traditional magnetic transformers with semiconductor-based components, enabling operation at higher frequencies and offering the potential for smaller and lighter designs. The solid-state transformer typically includes high-frequency switching elements, such as transistors, and uses these to achieve voltage conversion and isolation. This is particularly beneficial in applications where isolation between input and output stages is required, such as in grid-connected power supplies or in systems where safety is a concern.

The solid-state transformer can also provide additional functionalities, such as bidirectional power flow, which is useful in applications involving energy storage or renewable energy sources, where power may need to be transferred in both directions between the grid and storage elements. The high efficiency of the solid-state transformer in the open loop stage contributes to the overall performance of the power converter, particularly in scenarios where the input and output voltage levels differ significantly and where traditional magnetic transformers would be too bulky or inefficient.

In a further embodiment of the present disclosure, the second stage open loop DC-DC converter may be configured to deliver discrete multiples of the intermediate DC voltage to the output DC voltage. By using discrete multiples, the design of the second stage converter can be simplified, reducing the need for complex control circuitry and allowing for a more compact and efficient implementation.

For example, if the intermediate voltage is set to a base value, the second stage can deliver output voltages that are simple multiples of this base, such as 2×, 3×, or 4× the intermediate voltage. The use of discrete multiples allows for straightforward scaling of the power converter to meet different output voltage requirements by simply adjusting the configuration of the second stage.

The second stage open loop DC-DC converter may comprise a plurality of parallel open loop DC-DC sub-converters. This architecture enhances the scalability and flexibility of the power converter. By distributing the load across multiple sub-converters, the system can handle higher power levels or provide redundancy in case of sub-converter failure, which is critical in applications where reliability is paramount. Each sub-converter can be designed to handle a portion of the total power, reducing the thermal and electrical stress on individual components and improving the overall efficiency and lifespan of the converter.

Parallel sub-converters can also allow for dynamic load sharing, where the power output is distributed evenly among active sub-converters. This may be useful, for example, in applications with varying load conditions, where the system can dynamically adjust the number of active sub-converters based on the current load demand, ensuring optimal efficiency and performance. The modular nature of this configuration also makes it easier to upgrade or expand the power converter by adding or removing sub-converters as needed.

In one embodiment, the power converter comprises a plurality of parallel open-loop DC-DC sub-converters configured to receive the intermediate DC voltage as input. These sub-converters are capable of generating a plurality of output DC voltages or a plurality of output DC currents. By enabling parallel operation, this configuration allows for efficient distribution of power to multiple loads or to different sections of a single load. The flexibility to produce multiple outputs makes this architecture particularly advantageous in applications requiring varied voltage or current levels, such as systems powering different components with distinct electrical requirements.

In some implementations, the plurality of parallel open-loop DC-DC sub-converters are realized as parallel switched-capacitor converters. The switched-capacitor topology is particularly suited for this purpose due to its high efficiency and compact design. These converters rely on capacitive charge transfer mechanisms to perform voltage or current conversion without the need for bulky inductive components. The use of parallel switched-capacitor converters further enhances the power density of the system while maintaining high conversion efficiency.

In a further embodiment, the plurality of parallel open-loop DC-DC sub-converters may be configured to operate with the same or different conversion rates. This arrangement provides additional flexibility, enabling the power converter to supply different voltage or current levels to various loads or optimize power delivery based on the specific demands of a single load. The controller is configured to enable or disable the open-loop DC-DC sub-converters individually, allowing for dynamic load management and efficient operation. By selectively activating sub-converters, the system can tailor its output to varying load conditions, minimize energy losses, and enhance overall reliability.

These features collectively improve the versatility and efficiency of the power converter, enabling its deployment in a wide range of applications, from consumer electronics to industrial systems, where compact, high-performance, and scalable power delivery is required. The parallel configuration of sub-converters can enhance system robustness by providing redundancy, as individual sub-converters can be disabled without affecting the operation of the remaining ones.

In one embodiment of the present disclosure, the plurality of parallel open loop DC-DC sub-converters may be parallel switched-capacitor converters. This implementation leverages the advantages of switched-capacitor technology, such as high efficiency and compact size, while offering the benefits of parallel operation. Parallel switched-capacitor converters are useful in applications requiring high output current or where redundancy is needed to ensure continuous operation in the event of component failure. By using parallel configurations, the power converter can maintain high efficiency even at higher power levels, as each sub-converter operates within its optimal range.

The use of parallel switched-capacitor converters also allows for greater flexibility in managing the output voltage and current. For example, the controller can activate or deactivate individual sub-converters to match the load demand, which is beneficial in systems with fluctuating power requirements. This approach not only improves efficiency but also enhances the reliability and longevity of the power converter by reducing the stress on individual components.

The plurality of parallel open loop DC-DC sub-converters may have the same or different conversion rates, and the controller may be configured to enable or combine the open loop DC-DC sub-converters individually or according to predetermined fixed power conversion configurations. This feature allows for precise control over the output characteristics of the power converter. By configuring sub-converters with different conversion rates, the system can provide a wide range of output voltages or currents without the need for complex circuitry or multiple converters.

The controller's ability to selectively engage or combine sub-converters based on real-time conditions or predetermined configurations enables efficient power management. For instance, in a scenario where the load demand suddenly increases, the controller can instantly activate additional sub-converters to meet the demand without compromising the stability or efficiency of the system. This flexibility may be useful in applications with dynamic load profiles, such as in telecommunications or computing systems, where the power requirements can change rapidly and unpredictably.

In one embodiment of the present disclosure, the second stage open loop DC-DC converter may comprise a plurality of open loop DC-DC sub-converters that are combinable to provide a combined fixed conversion rate. This configuration is advantageous in systems where a stable and precise output voltage is required, and where the ability to scale the output power is important. By combining multiple sub-converters with fixed conversion rates, the system can ensure that the output voltage remains within the desired range even as the power demands change.

This approach may also be useful in applications where the power converter needs to support multiple operating modes or where different output levels are required under different conditions. The ability to combine sub-converters provides a straightforward method for scaling the converter's capabilities, allowing it to meet varying power needs without requiring significant changes to the overall design. Additionally, this modularity simplifies maintenance and upgrades, as sub-converters can be easily added, removed, or replaced as needed.

In the presently disclosed power converter, a second power density of the second stage open loop DC-DC converter may be higher than a first power density of the first stage regulated DC-DC converter. Power density refers to the amount of power that can be delivered per unit volume of the converter. A higher power density in the second stage allows for a more compact design, which is particularly beneficial in applications where space is limited, such as in portable electronics, aerospace, or automotive applications. The higher power density of the second stage is achieved by the fact that the second stage being open loop and further emphasized by optimizing the design for efficiency and minimizing the use of bulky components, such as inductors, which are often necessary in the first stage regulated converter.

The first current density can be comprised between 0.1 $A/mm^2$ and 1 $A/mm^2$, such as between 0.1 $A/mm^2$ and 0.5 $A/mm^2$, such as between 0.5 $A/mm^2$ and 1 $A/mm^2$. The second current density can be comprised between 0.8 $A/mm^2$ and 10 $A/mm^2$, such as between 0.8 $A/mm^2$ and 5 $A/mm^2$, such as between 5 $A/mm^2$ and 10 $A/mm^2$.

This design consideration may enable the second stage to be placed closer to the load, reducing the length of interconnects and associated power losses. By minimizing the distance between the second stage and the load, the system can achieve higher overall efficiency and better thermal management. The compact size of the second stage also makes it easier to integrate into confined spaces, such as within the casing of a device or close to sensitive components where precise voltage regulation is required.

The second power efficiency of the second stage open loop DC-DC converter may be higher than the first power efficiency of the first stage regulated DC-DC converter. Power efficiency is a measure of how well the converter converts the input power to the desired output power with minimal losses. A higher power efficiency in the second stage means that the converter can deliver more power to the load with less input power, which may be particularly advantageous in applications requiring compact designs and high efficiency. By optimizing the power efficiency of the second stage, the overall power conversion system can achieve higher efficiency, reduce thermal losses, and improve the reliability of the load. Additionally, this architecture may allow for the second stage to be positioned closer to the load, minimizing transmission losses and further enhancing the system's performance under varying operating conditions.

The first power efficiency can be comprised between 90% and 95%, such as between 90% and 91%, such as between 91% and 92%, such as between 92% and 93%, such as between 93% and 94%, such as between 94% and 95%. The second power efficiency can be comprised between 94% and 98%, such as between 94% and 95%, such as between 95% and 96%, such as between 96% and 97%, such as between 97% and 98%.

In one embodiment of the present disclosure, the first stage regulated DC-DC converter may comprise a switched-mode converter, preferably a buck converter, and the second stage open loop DC-DC converter may comprise a switched-capacitor converter. This specific combination is advantageous in applications where a significant voltage step-down is required. The buck converter efficiently reduces the input voltage to an intermediate level, which is then further processed by the switched-capacitor converter to achieve the desired output voltage.

The buck converter operates by switching a series of transistors on and off rapidly, controlling the amount of energy transferred from the input to the output. This process is highly efficient, especially when the input voltage is significantly higher than the desired output voltage. The switched-capacitor converter then takes this intermediate voltage and uses a series of capacitors and switches to achieve the final output voltage, which can be lower, equal to, or higher than the intermediate voltage depending on the configuration.

This combination can be useful, for example, for digital circuits, where precise voltage regulation is needed to ensure the reliable operation of microprocessors and other digital components. The use of a switched-capacitor converter in the second stage allows for a compact design that can be integrated close to the load, reducing power losses and improving overall system efficiency.

In a further embodiment of the present disclosure, the first stage regulated DC-DC converter comprises a resonant converter, and the second stage open loop DC-DC converter may comprise a switched-capacitor converter. This combination leverages the strengths of both technologies to achieve high efficiency and low noise operation. The resonant converter operates by creating a resonant circuit with inductors and capacitors, which allows for smooth and efficient energy transfer at high frequencies.

This type of converter may be useful in applications where minimizing electromagnetic interference (EMI) is important, such as in communication systems or medical devices. The second stage switched-capacitor converter further processes the intermediate voltage from the resonant converter to achieve the final output voltage. The lack of inductors in the switched-capacitor converter means that the overall design is compact and less prone to generating EMI, which also makes this combination useful for sensitive electronic systems.

By having this combination, the intermediate DC voltage may be lower than the input DC voltage, and the output DC voltage may be lower than the intermediate DC voltage. This voltage hierarchy is typical in applications where a significant step-down in voltage is required, such as in low-voltage power supplies for digital circuits or portable devices. By first reducing the input voltage to an intermediate level, the system can optimize each stage for efficiency and performance.

In this configuration the first stage reduces the voltage to a manageable level, which is then further reduced by the second stage to meet the specific requirements of the load. This approach allows for precise control over the output voltage in a very efficient configuration, ensuring that it remains stable and within the desired range even as the input voltage or load conditions change. The ability to step down the voltage in stages also reduces the thermal stress on individual components, improving the overall reliability and lifespan of the power converter.

In one embodiment of the present disclosure, the first stage regulated DC-DC converter may comprise a linear regulator, and the second stage open loop DC-DC converter may comprise a switched-capacitor voltage multiplier.

In this configuration the second stage switched-capacitor voltage multiplier increases the voltage to the desired level without the need for inductors or transformers. This configuration is advantageous in systems where space is limited, and where the use of magnetic components would introduce unwanted noise or require additional shielding. The simplicity and low noise of the linear regulator combined with the efficiency and compactness of the switched-capacitor voltage multiplier make this a powerful solution for precision power supplies.

In this embodiment, the output DC voltage may be higher than the input DC voltage. This scenario is common in applications where the power supply needs to provide a voltage higher than the available input, such as in battery-powered devices or energy harvesting systems. By using a voltage multiplier in the second stage, the system can achieve the necessary voltage boost with high efficiency and minimal component count.

This approach is particularly useful in applications where the power supply must be able to deliver the necessary voltage for the device to operate correctly. The ability to step up the voltage efficiently allows for the use of lower-voltage batteries or energy sources, which can be smaller, lighter, and less expensive, while still providing the required power for the application.

In one embodiment, the first stage regulated DC-DC converter comprises a switched-mode converter, preferably a boost converter, and the second stage open loop DC-DC converter may comprise a switched-capacitor voltage multiplier. This combination is particularly useful in applications requiring a significant increase in voltage, such as in power supplies for sensors, communication devices, or other electronics that operate at higher voltages than the available input.

In this configuration, the boost converter efficiently steps up the input voltage to an intermediate level, which is then further increased by the switched-capacitor voltage multiplier to achieve the final output voltage. This configuration allows for a highly efficient and compact power supply capable of delivering high voltages with minimal losses, making it useful for applications where both high voltage and small size are critical.

The output DC voltage may be significantly higher than the input DC voltage. More specifically, in one embodiment of the present disclosure, the output DC voltage may be at least 10 times higher than the input DC voltage, such as at least 2 times higher than the input DC voltage, such as at least 5 times higher than the input DC voltage, such as at least 1.5 times higher than the input DC voltage. This level of voltage may be advantageous in various high-voltage power supplies, such as for industrial equipment or high-power LEDs. By combining a boost converter with a switched-capacitor voltage multiplier, the system can achieve this high level of voltage increase with high efficiency and minimal space.

The present disclosure further relates to an electrical apparatus comprising: a power converter according to any of the above embodiments; and a load supplied by the power converter. The electrical apparatus may be any electrical device that uses a power converter. In such a device the second stage open loop DC-DC converter may be placed closer to the load, which reduces losses associated with long interconnects and improving overall system performance.

By placing the second stage open loop converter closer to the load, the length of the interconnects between the converter and the load is minimized. This reduction in interconnect length decreases resistive losses that occur when current flows through the connecting wires or traces. In high-current applications, these losses can be significant, leading to wasted power and reduced efficiency. Reducing the interconnect length thus improves the overall power delivery efficiency, ensuring that a higher proportion of the power generated by the converter reaches the load.

Additionally, placing the second stage closer to the load also reduces the likelihood of voltage drops along the interconnects. Voltage drops may be problematic in low-voltage, high-current systems where even small amounts of resistance can cause significant drops in the delivered voltage. By minimizing voltage drops, the system can deliver a more consistent and reliable voltage to the load, improving the overall performance and longevity of the electrical apparatus.

The compact design of the second stage open loop DC-DC converter, which typically utilizes switched-capacitor or other high-efficiency components, makes it well-suited for integration directly into or near the load. This proximity not only improves electrical performance but also simplifies the system design by reducing the complexity of the power distribution network. In applications where space is limited, such as in portable electronics, automotive systems, or aerospace environments, this integration allows for more efficient use of available space without compromising power delivery quality.

In one embodiment, the second stage open loop DC-DC converter may be disposed within a load package, which could house both the load and the converter. This close coupling of the converter and load further reduces power distribution losses and improves thermal management. By co-locating the converter with the load, heat generated by the power conversion process can be more effectively managed through shared cooling mechanisms or heat sinks, preventing localized overheating and extending the operational lifespan of the system.

In a further embodiment of the presently disclosed power converter, the power converter and the load may be disposed in a common package. This integration offers advantages in terms of efficiency and space optimization. For example, in systems such as system-on-chip (SoC) architectures or integrated power modules, placing the power converter and the load within the same package allows for precise control over power delivery and enables the use of shorter, optimized electrical connections. These systems benefit from reduced electromagnetic interference (EMI), improved thermal performance, and enhanced reliability due to fewer external interconnects. The common package can be an integrated circuit (IC), preferably a single chip or a semiconductor package, more preferably a system-on-chip (SoC) or a system-in-package (SiP).

Moreover, integrating the power converter and load in a common package allows for more efficient management of parasitic effects, such as inductance and capacitance, which can degrade the performance of high-speed or high-frequency power converters. By minimizing the physical distance between the converter and load, the design can reduce parasitic inductance, which can otherwise lead to oscillations, voltage spikes, or reduced conversion efficiency in high-frequency switching applications.

The present disclosure further relates to a method of converting an input DC voltage to an output DC voltage, the method comprising the steps of providing a power converter comprising a first stage regulated DC-DC converter adapted to receive an input DC power and generate an intermediate DC voltage; a second stage open loop DC-DC converter adapted to receive the intermediate DC voltage from the first stage regulated DC-DC converter and generate an output DC voltage; and controlling the regulated DC-DC converter based on measurements of the output DC voltage. The regulation may have a target output DC voltage, which may also be referred to as a reference output DC voltage. The controller may control the first stage regulated DC-DC converter to regulate the output DC voltage.

A person skilled in the art will recognize that the presently disclosed method of converting an input DC voltage to an output DC voltage may be performed using any embodiment of the presently disclosed power converter, and vice versa.

As would be understood by a person skilled in the art, the controller may be implemented in various forms, depending on the specific application requirements. The processing unit may include, but is not limited to, a general-purpose microcontroller, a digital signal processor (DSP), an application-specific integrated circuit (ASIC), or a field-programmable gate array (FPGA). The processing unit may be a single-core processor configured to execute control algorithms that manage the regulation of the intermediate and output DC voltages. Alternatively, in more complex systems, the processing unit may be a multi-core processor. In specific cases, the processing unit may also include hardware accelerators designed to perform specific tasks more efficiently. For example, a hardware accelerator may be used to handle real-time control functions, such as pulse-width modulation (PWM) signal generation or fast Fourier transform (FFT) computations for analyzing power signals. These accelerators may be integrated with the central processing unit (CPU) or operate independently, depending on the architecture. Both the hardware accelerator and the CPU may be connected to a data communication infrastructure, such as a high-speed bus or network-on-chip (NoC), to facilitate fast and efficient communication between system components. In some embodiments, the processing unit may be a digital signal processor (DSP). The processing unit may also be implemented using an application-specific integrated circuit (ASIC), which can be custom-designed to perform the specific control tasks required by the power converter, or using a field-programmable gate array (FPGA).

The processing unit may also include or interact with external memory components, such as RAM, ROM, or flash memory, which store control algorithms, operational parameters, and other data required for the power management process. The processing unit may access these memory components via a dedicated memory interface or through a shared data bus, depending on the system architecture.

The processing unit may further be connected to various sensors and actuators, such as voltage and current sensors, temperature sensors, and control switches. These components provide the processing unit with real-time feedback on the system's operating conditions, allowing it to adjust the power converter's operation as necessary. For instance, the processing unit may use data from voltage and current sensors to adjust the duty cycle of the first stage regulated DC-DC converter or to enable or disable sub-converters in the second stage to optimize power delivery.

DETAILED DESCRIPTION OF DRAWINGS

The invention will in the following be described in greater detail with reference to the accompanying drawings. The drawings are examples and are intended to illustrate some of the features of the presently disclosed power converter and method of converting an input DC voltage to an output DC voltage, and are not to be construed as limiting to the presently disclosed invention.

FIG. 1 shows one embodiment of the presently disclosed multi-stage power converter architecture. FIG. 1 illustrates an embodiment of the two-stage power converter architecture 100. The power converter comprises an input source 101, a first stage regulated DC-DC converter 102, a second stage open-loop DC-DC converter 103, a controller 104, and a load 105. The input source 101 is adapted to provide an input DC voltage or input DC current to the power converter. The input source may include various types of DC power supplies, such as a battery, an external DC power adapter, or a renewable energy source like a solar panel. By allowing for both input voltage and/or current sources, the system is versatile and can accommodate a wide range of input conditions based on the specific application. The first stage regulated DC-DC converter 102 is configured to convert the input DC voltage received from the input source 101 into an intermediate DC voltage. This regulated first stage provides precise control over the intermediate voltage, thereby compensating for variations in the input source or load demands. By ensuring a stable intermediate voltage, the first stage improves the overall reliability of the system and reduces the stress on components in the subsequent stages. The intermediate DC voltage is then supplied to the second stage open-loop DC-DC converter 103, which converts the intermediate voltage into the final output DC voltage. The second stage operates in an open-loop configuration with a fixed conversion ratio, which enables high efficiency and simplicity in design. The absence of active regulation in the second stage reduces the control complexity and contributes to higher power density, making it particularly well-suited for applications requiring compact and efficient power delivery. The controller 104 regulates the first stage regulated DC-DC converter 102 based on feedback obtained from the output DC voltage delivered to the load 105. By comparing the measured output DC voltage to a target output voltage, the controller dynamically adjusts the intermediate voltage generated by the first stage. This ensures that the final output voltage remains stable and within the desired range, even in the presence of variations in the input voltage or load conditions. The regulation process is simplified by focusing control efforts on the first stage, while the second stage remains optimized for efficiency. The load 105 represents the electrical or electronic system receiving the output DC voltage. The load may include, for example, electronic circuits, processors, or other components requiring reliable and precise power delivery. The compact nature of the second stage allows it to be placed closer to the load, minimizing losses associated with interconnects and improving overall system performance.

Figure 2:
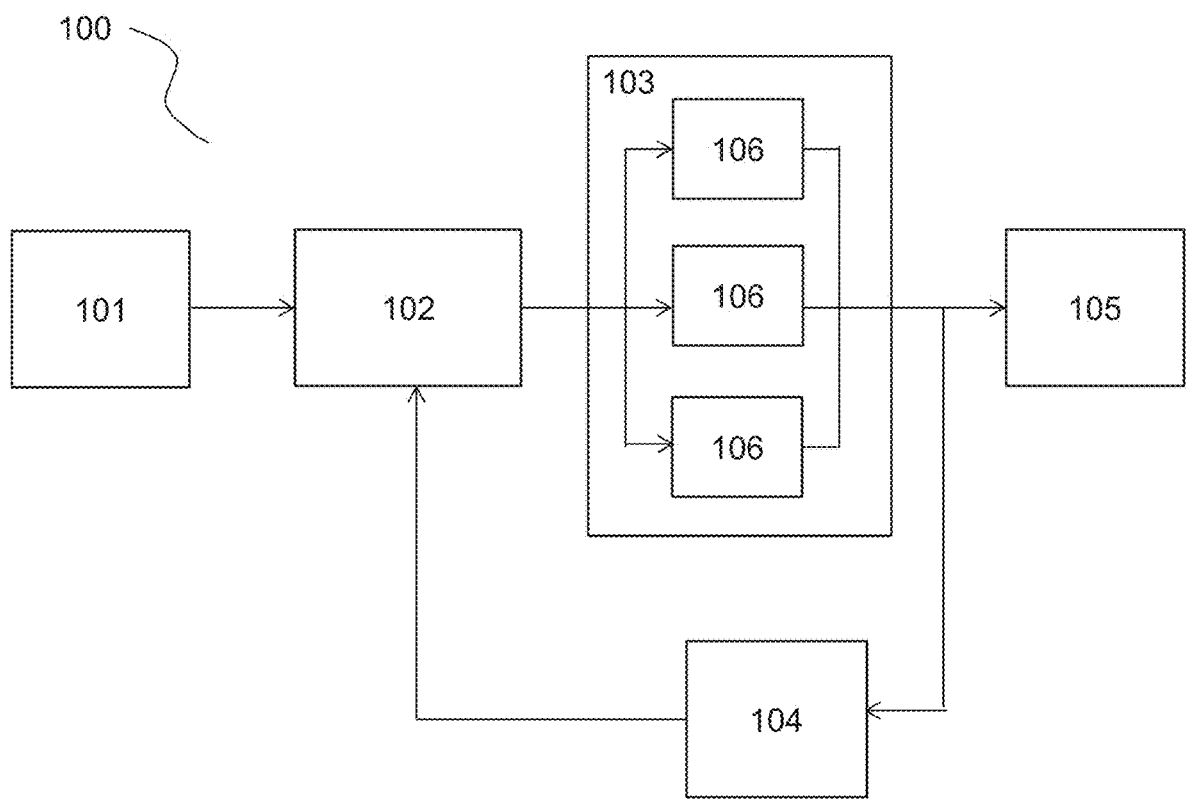
FIG. 2 shows a further embodiment of the presently disclosed two-stage power converter architecture, wherein the second stage open loop DC-DC converter comprises a plurality of parallel open loop DC-DC sub-converters.

FIG. 2 shows a further embodiment of the presently disclosed multi-stage power converter architecture, wherein the second stage open loop DC-DC converter comprises a plurality of parallel open loop DC-DC sub-converters. FIG. 2 illustrates a further embodiment of the multi-stage power converter architecture 100, such as a two-stage power converter architecture. Similar to the embodiment shown in FIG. 1, the power converter comprises an input source 101, a first stage regulated DC-DC converter 102, a second stage open-loop DC-DC converter 103, a controller 104, and a load 105. In this embodiment, the second stage open-loop DC-DC converter 103 comprises a plurality of parallel open-loop DC-DC sub-converters 106. The input source 101 provides the input DC voltage or input DC current to the power converter. As described previously, the input source may include a variety of DC power supplies, such as batteries, external DC power adapters, or renewable energy sources. The first stage regulated DC-DC converter 102 receives the input voltage from the input source and converts it into an intermediate DC voltage. The intermediate voltage is then supplied to the second stage open-loop DC-DC converter 103. The first stage ensures stable regulation of the intermediate voltage, enabling optimal operation of the second stage. The second stage open-loop DC-DC converter 103 includes a plurality of open-loop DC-DC sub-converters 106 operating in parallel. Each sub-converter 106 receives the intermediate voltage from the first stage and contributes to generating the final output DC voltage supplied to the load 105. The use of multiple sub-converters in parallel allows the second stage to distribute the power load across the sub-converters, reducing stress on individual components and improving the overall efficiency and reliability of the system. Additionally, the modular design of the second stage enables the activation or deactivation of individual sub-converters as required, offering scalability and flexibility to accommodate varying load conditions. The controller 104 monitors the output DC voltage delivered to the load 105 and regulates the operation of the first stage 102. By comparing the measured output voltage to a target output voltage, the controller dynamically adjusts the intermediate voltage provided by the first stage to maintain stable and precise power delivery. In addition, the controller may selectively activate or deactivate individual sub-converters 106 in the second stage to optimize performance and efficiency based on the current load requirements. The load 105 receives the final output DC voltage from the second stage open-loop DC-DC converter 103. The parallel arrangement of the sub-converters in the second stage allows for efficient power delivery while minimizing losses, making this architecture particularly suitable for high-power applications or scenarios requiring redundancy and reliability.

Figure 3A:
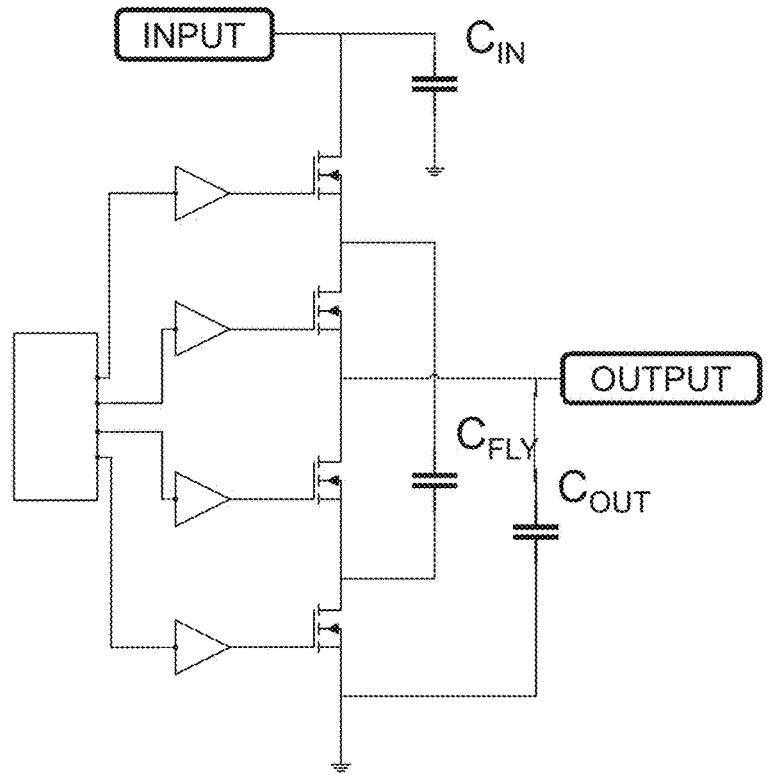
FIG. 3A-B show examples of a switched-capacitor current multiplier and a switched-capacitor voltage multiplier, which may be used in the second stage open loop DC-DC converter.
Figure 3B:
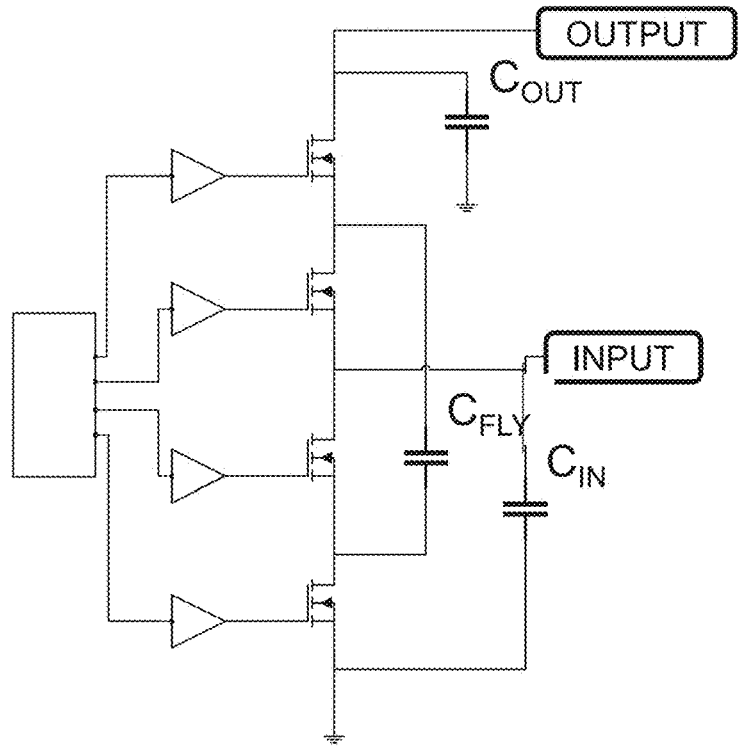

FIGS. 3A-B show examples of a switched-capacitor current multiplier and a switched-capacitor voltage multiplier, which may be used in the second stage open loop DC-DC converter. FIG. 3A and FIG. 3B illustrate two implementation examples of the second stage open-loop DC-DC converter, specifically using switched-capacitor topologies to achieve current or voltage multiplication. FIG. 3A shows an embodiment of a switched-capacitor current multiplier. The switched-capacitor current multiplier receives an input voltage at the input terminal, labeled "INPUT". The arrangement includes an input capacitor $C_{IN}$, a flying capacitor $C_{FLY}$, and an output capacitor $C_{OUT}$. The flying capacitor $C_{FLY}$ is switched between configurations by a series of switches, driven by a control circuit, to transfer charge efficiently. By appropriately sequencing the switches, the circuit increases the current delivered to the output while maintaining the input voltage level. The output capacitor $C_{OUT}$ smooths or filters the final output voltage delivered to the load connected to the output terminal, labeled "OUTPUT". This implementation is particularly advantageous for applications requiring higher output current while maintaining a compact and efficient design, as it eliminates the need for bulky magnetic components like inductors. FIG. 3B shows an embodiment of a switched-capacitor voltage multiplier. Similar to FIG. 3A, the circuit comprises an input capacitor $C_{IN}$, a flying capacitor $C_{FLY}$, and an output capacitor $C_{OUT}$. The input voltage is received at the terminal labeled "INPUT". The flying capacitor $C_{FLY}$ is alternately charged and discharged by controlled switching to stack voltages and increase the output voltage. The output capacitor $C_{OUT}$ stabilizes or filters the resulting higher voltage, which is provided at the output terminal labeled "OUTPUT". This configuration is particularly advantageous for applications requiring significant voltage step-up, offering high efficiency without relying on inductors or transformers. Both switched-capacitor implementations in FIGS. 3A-B are compact and efficient, making them well-suited for integration into systems with space and weight constraints. These designs are inherently optimized for open-loop operation, which reduces complexity and ensures high power density. By selecting either the current multiplier (FIG. 3A) or voltage multiplier (FIG. 3B) depending on the application requirements, the system can deliver flexible and efficient power conversion tailored to the load's needs.

Figure 4:
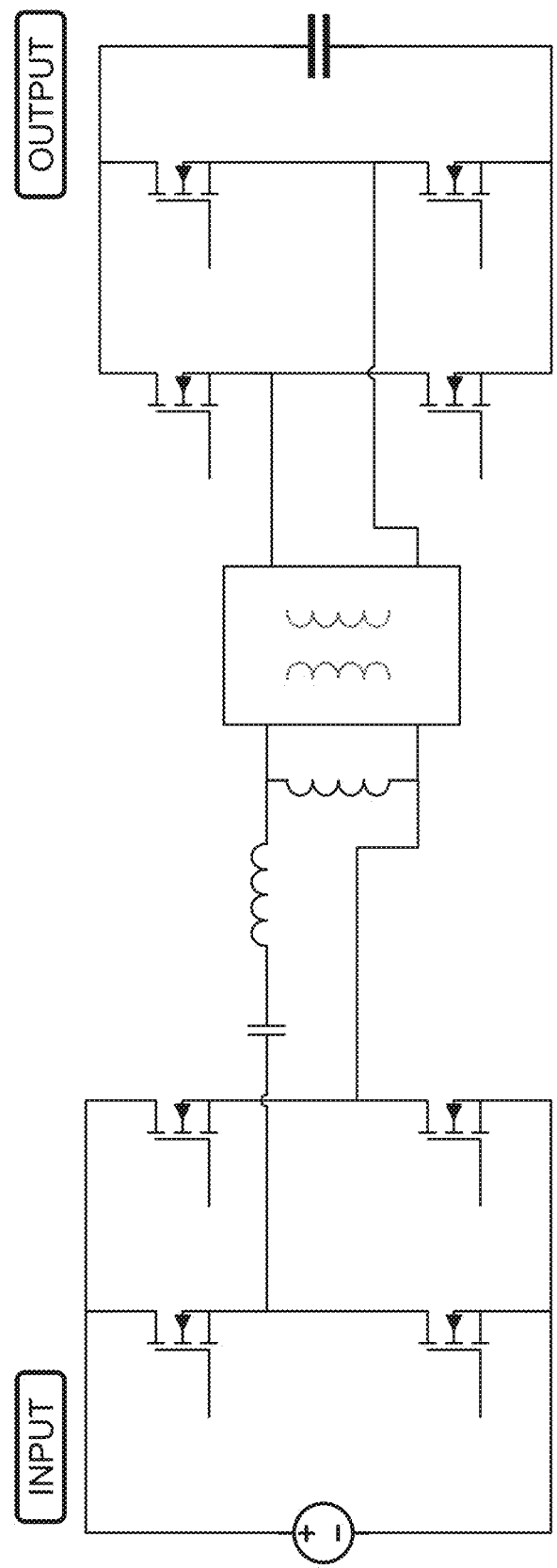
FIG. 4 shows an example of a solid-state transformer, which may be used in the second stage open loop DC-DC converter.

FIG. 4 shows an example of a solid-state transformer, which may be used in the second stage open loop DC-DC converter. FIG. 4 illustrates an embodiment of a second-stage open-loop DC-DC converter implemented as an LLC resonant converter. The LLC resonant converter is designed to achieve efficient DC-DC conversion by leveraging resonance between inductive and capacitive elements, minimizing switching losses and electromagnetic interference (EMI). This topology is particularly advantageous for applications requiring high efficiency, compact design, and smooth power delivery.

The circuit receives an input DC voltage at the input terminal labeled "INPUT". The primary stage includes a full-bridge switching configuration, where switches, such as MOSFETs, are controlled to generate an alternating current (AC) waveform. This waveform drives a resonant tank circuit comprising inductors and capacitors. The tank circuit includes a resonant inductor and capacitor, which together form the LLC resonant network. The resonance allows for efficient energy transfer by operating the switches at a frequency close to or equal to the resonant frequency, reducing switching losses significantly. The AC signal generated by the resonant tank is passed through a transformer, which provides electrical isolation and allows for voltage scaling depending on the turns ratio of the transformer windings. On the secondary side, the rectified AC signal is converted back into a DC voltage using a rectifier circuit, which typically comprises diodes or synchronous switches. The rectified voltage is then filtered and stabilized by an output capacitor, ensuring that a smooth output DC voltage is delivered at the terminal labeled "OUTPUT". The LLC resonant converter shown in FIG. 4 offers several advantages, including high efficiency due to soft switching (zero-voltage switching or zero-current switching), reduced thermal losses, and improved power density. The absence of significant switching losses enables the converter to operate at higher frequencies, allowing for the use of smaller passive components and achieving a more compact design. This implementation is particularly beneficial for high-power applications where efficiency and thermal performance are critical, such as in server power supplies, automotive systems, and telecommunications equipment.

Figure 5:
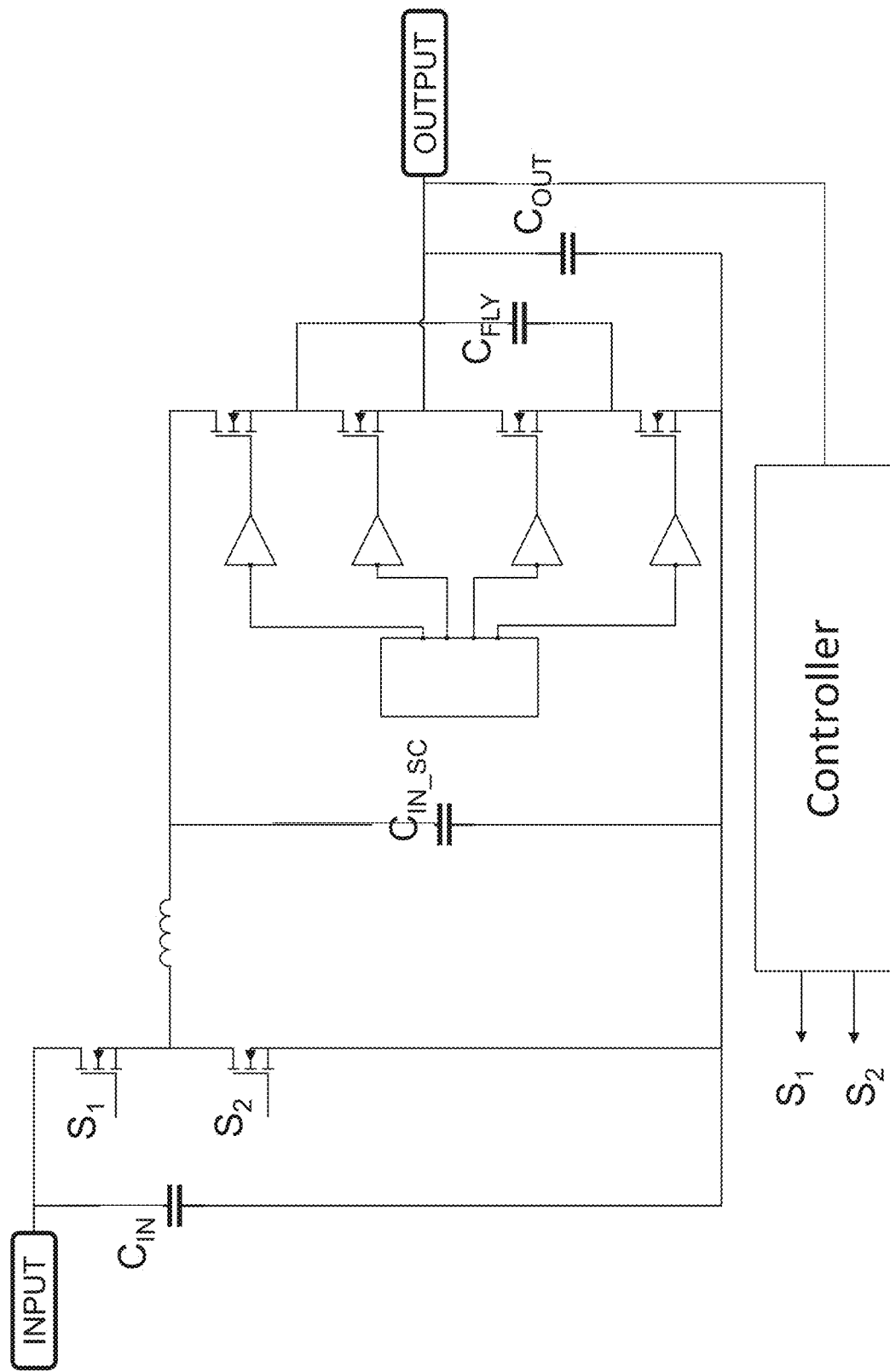
FIG. 5 shows an example of a two-stage power converter comprising a buck converter and a switched-capacitor converter.

FIG. 5 shows an example of a two-stage power converter comprising a buck converter and a switched-capacitor converter. FIG. 5 illustrates an example of a two-stage power converter architecture in which the first stage is implemented as a buck converter and the second stage is implemented as a switched-capacitor converter. This embodiment highlights the advantages of combining a regulated buck converter with a compact and efficient switched-capacitor converter to achieve precise power conversion with high efficiency. The circuit begins with an input DC voltage received at the input terminal labeled "INPUT". The first stage, shown at the left portion of the figure, is a buck converter comprising two switching elements, controlled by $S_1$ and $S_2$, an inductor, and an input capacitor $C_{IN}$. The buck converter reduces the input DC voltage to a regulated intermediate voltage. This intermediate voltage serves as the input to the second stage and is dynamically controlled by the controller based on feedback signals. The controller, illustrated at the bottom of the figure, generates control signals $S_1$ and $S_2$ for the first stage switching elements to regulate the intermediate voltage. The controller also manages the operation of the second stage switched-capacitor converter by controlling additional switches in the second stage. The controller operates based on measurements of the output DC voltage, ensuring that the final output remains stable and within the target range. The second stage, located in the right portion of the figure, comprises a switched-capacitor converter. This converter includes capacitors $C_{FLY}$ and $C_{OUT}$ and associated switches. The switched-capacitor topology achieves further voltage conversion by alternately charging and discharging the flying capacitor $C_{FLY}$ in coordination with the switching sequence. The output capacitor $C_{OUT}$ smooths the final output DC voltage, which is delivered to the output terminal labeled "OUTPUT". This combination of a buck converter in the first stage and a switched-capacitor converter in the second stage offers several advantages. The buck converter efficiently steps down the input voltage to an intermediate level, minimizing power losses during regulation. The switched-capacitor converter in the second stage further processes the intermediate voltage with a fixed conversion ratio, achieving high efficiency without the need for magnetic components such as inductors or transformers. This approach reduces size and weight, making it particularly suitable for applications where space and thermal performance are critical.

Figure 6:
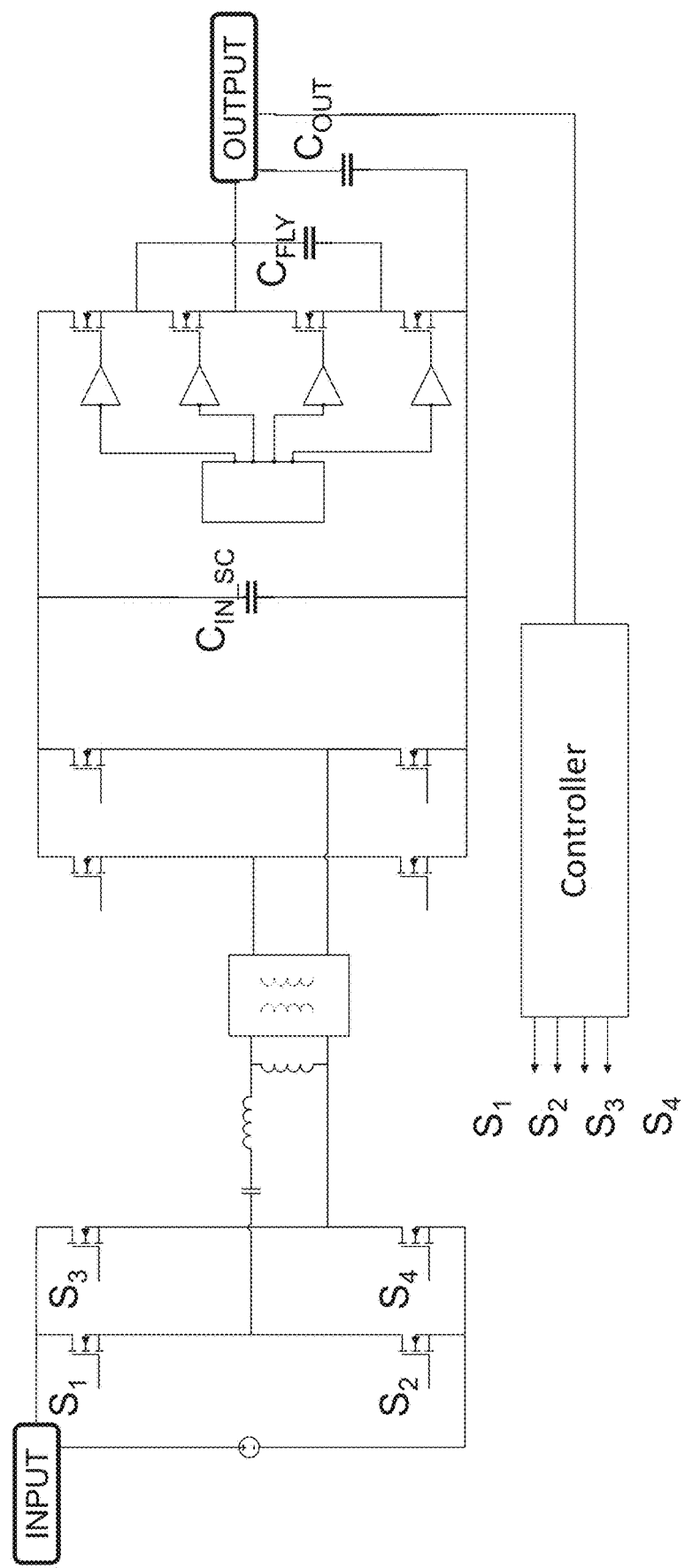
FIG. 6 shows an example of a two-stage power converter comprising a resonant converter and a switched-capacitor converter.

FIG. 6 shows an example of a two-stage power converter comprising a resonant converter and a switched-capacitor converter. FIG. 6 illustrates an example of a two-stage power converter architecture in which the first stage is implemented as a resonant converter, and the second stage is implemented as a switched-capacitor converter. In this embodiment, the first stage uses a resonant converter, which efficiently converts the input DC voltage to an intermediate DC voltage. The resonant converter operates at high frequencies and relies on a resonant tank circuit composed of inductors and capacitors. This design minimizes switching losses. The use of resonance improves overall efficiency and reduces electromagnetic interference (EMI), making it particularly well-suited for noise-sensitive applications. The controller, illustrated at the bottom of the figure, generates control signals $S_1$, $S_2$, $S_3$, and $S_4$ for the first stage switching elements to regulate the intermediate voltage. In other terms, the control signals are controlling the full-bridge switching configuration of the first stage. The controller also manages the operation of the second stage switched-capacitor converter by controlling additional switches in the second stage. The controller operates based on measurements of the output DC voltage, ensuring that the final output remains stable and within the target range. The output DC voltage is filtered using $C_{OUT}$. The second stage of the power converter is a switched-capacitor converter. The intermediate DC voltage generated by the resonant converter is further processed by the switched-capacitor converter to produce the final output DC voltage. The switched-capacitor converter achieves voltage conversion by alternately charging and discharging the capacitor $C_{FLY}$ using controlled switches. This design avoids the need for magnetic components, enabling a compact implementation with high power density. The combination of a resonant converter in the first stage and a switched-capacitor converter in the second stage offers several advantages. The resonant converter provides efficient and low-noise conversion of the input voltage to the intermediate voltage, while the switched-capacitor converter delivers a compact and efficient solution for achieving the desired output voltage. Together, these two stages enable a power converter that is highly efficient, compact, and well-suited for applications requiring low noise and minimal thermal losses. FIG. 6 demonstrates how this architecture leverages the strengths of both resonant and switched-capacitor technologies to provide a versatile and efficient power conversion solution.

Figure 7:
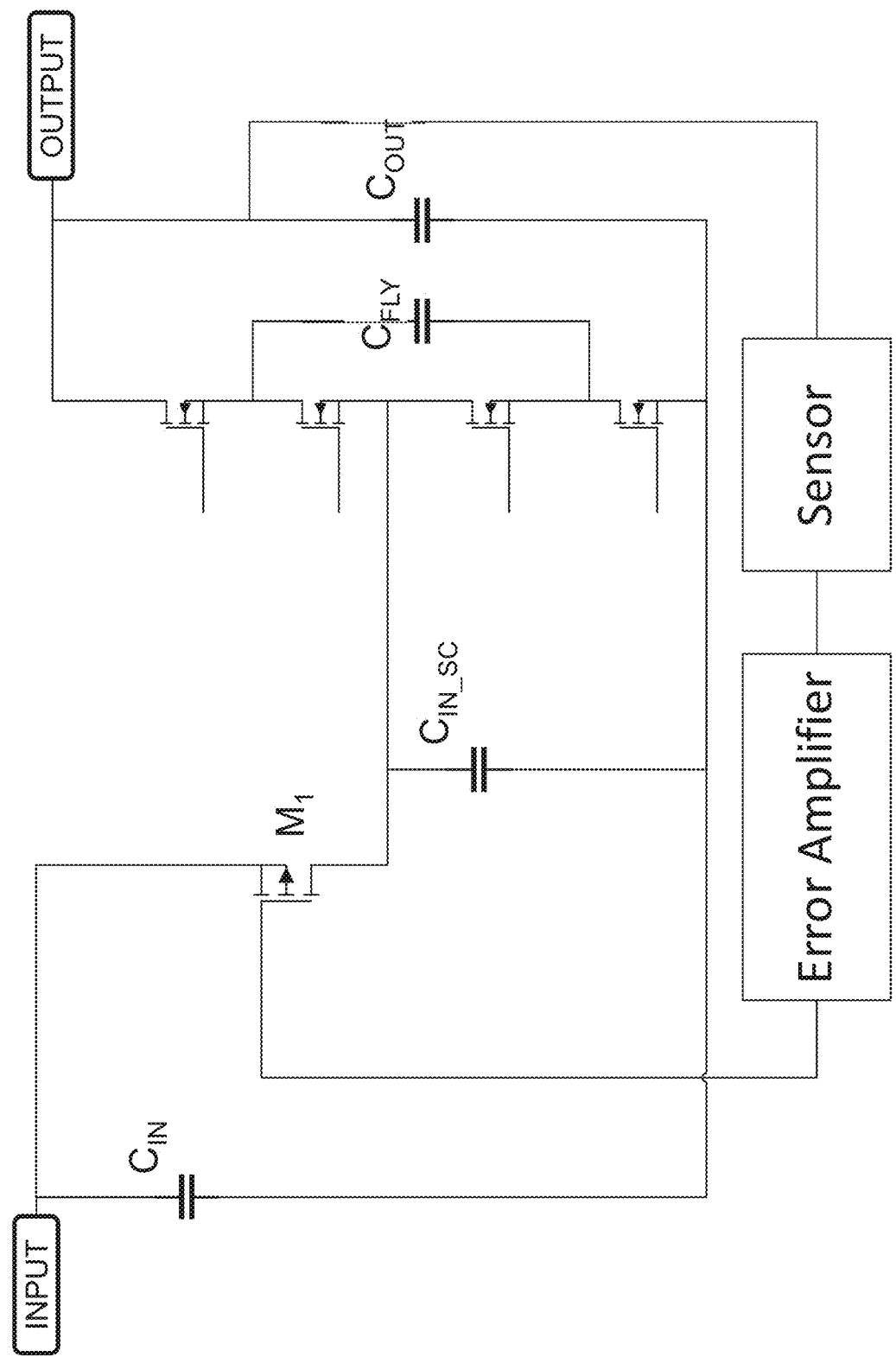
FIG. 7 shows an example of a two-stage power converter comprising a linear regulator and a switched-capacitor voltage multiplier.

FIG. 7 shows an example of a two-stage power converter comprising a linear regulator and a switched-capacitor voltage multiplier. FIG. 7 illustrates an example of a two-stage power converter architecture in which the first stage is implemented as a linear regulator, and the second stage is implemented as a switched-capacitor voltage multiplier. In this embodiment, the first stage linear regulator converts the input DC voltage to an intermediate DC voltage. The linear regulator provides precise and highly stable voltage regulation by continuously adjusting a pass element, such as a transistor, to maintain the intermediate voltage at the desired level. While linear regulators are less efficient compared to switching converters, they offer significant advantages in terms of low noise and simplicity, making them ideal for applications requiring clean and highly stable intermediate voltages. The second stage comprises a switched-capacitor voltage multiplier, which further processes the intermediate DC voltage to generate the desired output DC voltage. The switched-capacitor voltage multiplier increases the intermediate voltage by stacking charge within a capacitor $C_{FLY}$. This design eliminates the need for inductors or transformers, allowing for a compact and lightweight implementation with high power density. The output voltage is stabilized using an output capacitor $C_{OUT}$ to ensure a smooth and reliable power supply to the load, preferably connected at the output terminal labeled "OUTPUT". A sensor is sensing the output DC voltage in order to provide an error correction, which is treated by the Error Amplifier, that is configured to provide a signal control to the MOSFET $M_1$, in the linear regulator, thereby adjusting the intermediate DC voltage. The error amplifier serves to maintain precise regulation of the output voltage by comparing a feedback signal representing the actual output DC voltage with a reference target voltage. This comparison generates an error signal, which reflects the deviation between the two values. The controller uses this error signal to dynamically adjust the operation of the first stage regulated DC-DC converter, such as by modifying the gate voltage on the MOSFET $M_1$ or other control parameters. By continuously minimizing the error signal, the error amplifier ensures that the output voltage remains stable and within the desired range, even under varying input voltages or load conditions. Additionally, the error amplifier contributes to system stability by facilitating smooth control adjustments and avoiding issues such as overshoot or oscillation. This function is critical for achieving reliable and precise voltage regulation in the two-stage power converter architecture. The combination of a linear regulator in the first stage and a switched-capacitor voltage multiplier in the second stage offers several advantages. The linear regulator ensures precise and noise-free regulation of the intermediate voltage, which is particularly beneficial for sensitive applications, such as analog circuits or low-noise power supplies. The switched-capacitor voltage multiplier in the second stage efficiently increases the voltage to the desired output level without the use of bulky magnetic components, enabling a compact and efficient design.

Figure 8:
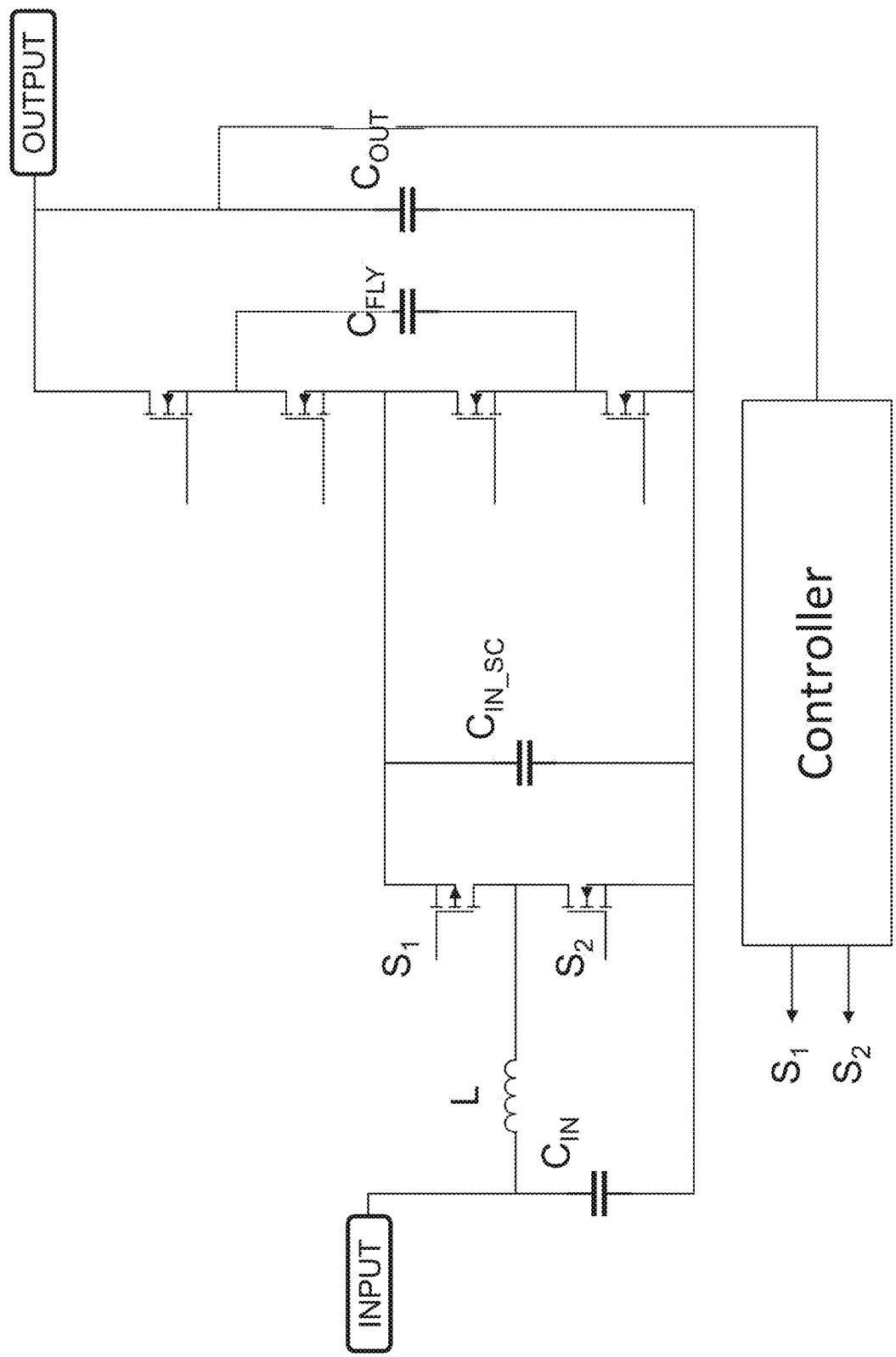
FIG. 8 shows an example of a two-stage power converter comprising a boost converter and a switched-capacitor voltage multiplier.

FIG. 8 shows an example of a two-stage power converter comprising a boost converter and a switched-capacitor voltage multiplier. FIG. 8 illustrates an example of a two-stage power converter architecture in which the first stage is implemented as a boost converter, and the second stage is implemented as a switched-capacitor voltage multiplier. This embodiment demonstrates how the combination of a boost converter and a switched-capacitor voltage multiplier can achieve a significant step-up in voltage with high efficiency and compact design. In this architecture, the first stage boost converter receives the input DC voltage at the input terminal and converts it to a higher intermediate DC voltage. The input DC voltage is filtered with the capacitor $C_{IN}$. The boost converter operates by switching inductive energy within the inductor L to step up the input voltage while maintaining high efficiency through controlled switching. The intermediate voltage generated by the boost converter serves as the input to the second stage. The second stage comprises a switched-capacitor voltage multiplier. This stage further increases the intermediate voltage to the desired output DC voltage by sequentially charging and discharging the capacitor $C_{FLY}$ in a controlled manner. The switched-capacitor voltage multiplier operates in an open-loop configuration with a fixed conversion ratio, eliminating the need for feedback regulation in this stage. The output capacitor $C_{OUT}$ stabilizes the final voltage delivered to the output terminal, ensuring a smooth and reliable power supply to the load. The controller is configured to deliver the signals $S_1$ and $S_2$ controlling the switches of the boost converter. The controller gets a feedback from the output voltage and is configured to adjust the signals $S_1$ and $S_2$ in order to deliver the correct intermediate DC voltage to the second stage of the two-stage power converter. The combination of the boost converter and the switched-capacitor voltage multiplier offers significant advantages in applications requiring substantial voltage increases. The boost converter efficiently steps up the input voltage to an intermediate level, while the switched-capacitor voltage multiplier provides additional voltage multiplication without the need for bulky magnetic components. This approach enables high power density, compact form factor, and minimal switching losses, making it well-suited for systems requiring high-voltage outputs, such as sensor power supplies, communication devices, or industrial applications.

Figure 9:
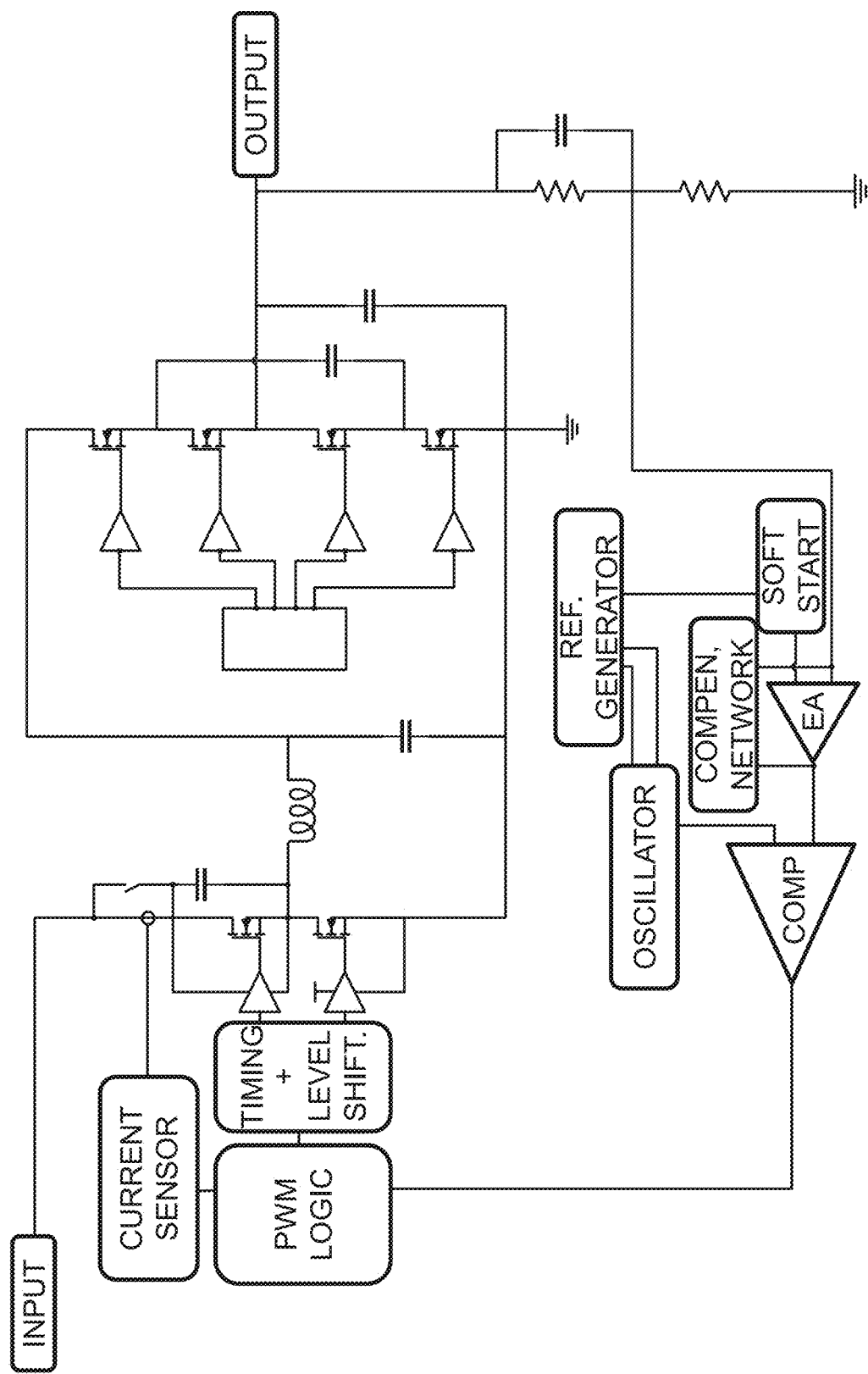
FIG. 9 shows an example of a process of regulating an output DC voltage.

FIG. 9 shows an example of a process of regulating an output DC voltage. FIG. 9 illustrates an example of the regulation process in the two-stage power converter architecture, showcasing the interaction between the input DC voltage, the intermediate DC voltage, the output DC voltage, and the corresponding control signals. FIG. 9 presents multiple functional blocks that work together to regulate the power conversion process and ensure stable output DC voltage. The system begins with the input DC voltage supplied at the input terminal labeled "INPUT". The input voltage is processed by the first stage regulated DC-DC converter, which is managed by control signals generated through PWM Logic and Level Shifters. In this embodiment, the first stage is a buck converter. These control signals determine the switching operation of the first stage transistors, ensuring that the intermediate DC voltage is generated with precision. A Current Sensor monitors the current flow through the converter, providing real-time feedback to the system for enhanced control and protection. The intermediate DC voltage is then supplied to the second stage open-loop converter, which processes it into the output DC voltage. In this embodiment, the second stage is a switched-capacitor converter. The output voltage is fed back into a Compensation Network, through a voltage divider which primarily generates a voltage feedback which is proportional to the output voltage provided at the output terminal "OUTPUT". The Compensation Network works in conjunction with the Error Amplifier (EA) and a Comparator (Comp). The Reference Generator provides a stable target voltage reference for comparison, while the Oscillator sets the operating frequency of the regulation process. The Compensation Network processes the error signal and stabilizes the system response, ensuring smooth and accurate adjustments without oscillations. Additionally, a Soft Start block is included to ensure a gradual and controlled start-up of the system, preventing large inrush currents or voltage spikes. The output signal of the Error Amplifier influences the control loop, dynamically adjusting the operation of the first stage to regulate the intermediate voltage, by controlling the PWM logic of the first stage. By maintaining precise control over the intermediate voltage, the system indirectly stabilizes the final output voltage delivered to the load. Overall, FIG. 9 demonstrates the complete regulation process of the two-stage power converter, highlighting the critical role of feedback, error compensation, and control logic. The combination of real-time monitoring, compensation, and dynamic adjustments ensures that the output voltage remains stable and within the desired range, even in the presence of input fluctuations or varying load conditions. The inclusion of key functional blocks such as the PWM Logic, Current Sensor, and Compensation Network ensures robust, efficient, and reliable power delivery at the output terminal "OUTPUT".

Figure 10:
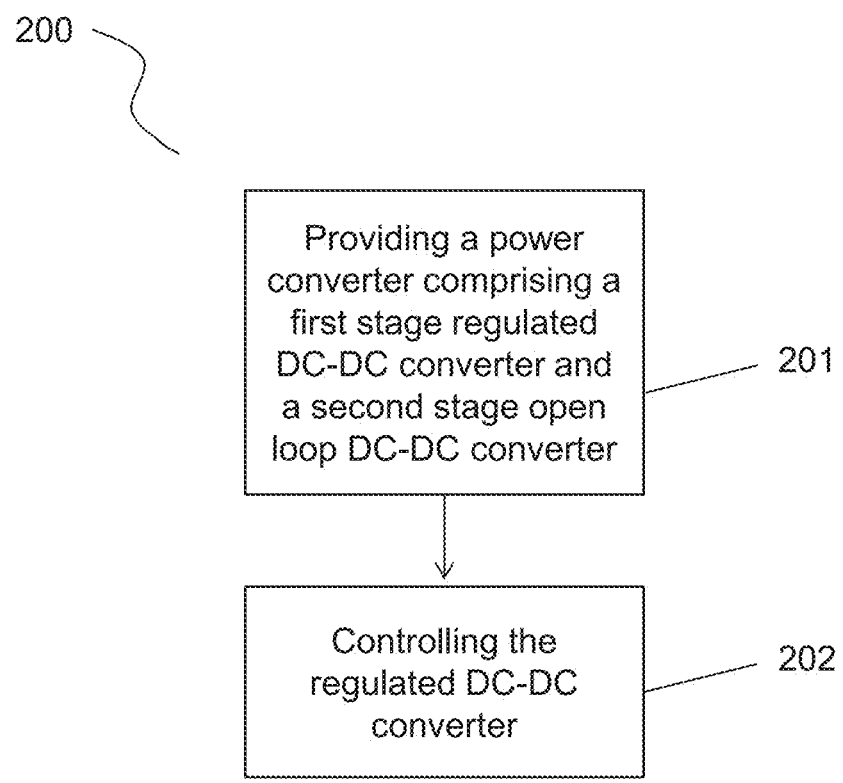
FIG. 10 shows a flow chart of one embodiment of the presently disclosed method of converting an input DC voltage to an output DC voltage.

FIG. 10 shows a flow chart of one embodiment of the presently disclosed method 200 of converting an input DC voltage to an output DC voltage, which comprises the steps of providing a power converter comprising a first stage regulated DC-DC converter and a second stage open loop DC-DC converter 201, and controlling the regulated DC-DC converter 202.

REFERENCE LIST

100—power converter
101—input source/input DC voltage
102—first stage
103—second stage
104—controller
105—output DC voltage/load.
106—DC-DC sub-converters
Further details
1. A power converter comprising:
   a first stage regulated DC-DC converter configured to convert an input DC voltage to an intermediate DC voltage;
   a second stage open-loop DC-DC converter configured to convert the intermediate DC voltage to an output DC voltage or an output DC current to a load; and
   a controller configured to control the regulated DC-DC converter to regulate the output DC voltage or the output DC current by adjusting the intermediate DC voltage, based on measurements of the output DC voltage or the output DC current and a target output DC voltage or a target output DC current.
2. The power converter according to item 1, wherein the first stage regulated DC-DC converter is a linear regulator, a switched-mode converter, a switched-capacitor converter or a resonant converter.
3. The power converter according to any one of the preceding items, wherein the second stage open loop DC-DC converter is a switched-capacitor current multiplier or a switched-capacitor voltage multiplier.
4. The power converter according to any one of the preceding items, wherein the second stage open loop DC-DC converter is a solid-state DC-DC transformer.
5. The power converter according to any one of the preceding items, wherein the second stage open loop DC-DC converter is configured to deliver discrete multiples of the intermediate DC voltage to the output DC voltage or current.
6. The power converter according to any one of the preceding items, wherein the second stage open loop DC-DC converter comprises a plurality of parallel open loop DC-DC sub-converters.
7. The power converter according to item 6, wherein the plurality of parallel open loop DC-DC sub-converters are configured to have the intermediate DC voltage as input, thereby being configured to provide a plurality of output DC voltages or a plurality of output DC currents.
8. The power converter according to any one of items 6-7, wherein the plurality of parallel open loop DC-DC sub-converters are parallel switched-capacitor converters.
9. The power converter according to any one of items 6-8, wherein the plurality of parallel open loop DC-DC sub-converters have the same or different conversion rates, and wherein the controller is configured to enable the open loop DC-DC sub-converters individually.
10. The power converter according to any one of the preceding items, wherein a second current density of the second stage open loop DC-DC converter is higher than a first current density of the first stage regulated DC-DC converter.
11. The power converter according to any one of the preceding items, wherein a second power efficiency of the second stage open loop DC-DC converter is higher than a first power efficiency of the first stage regulated DC-DC converter.
12. The power converter according to any one of the preceding items, wherein the first stage regulated DC-DC converter comprises a switched-mode converter, preferably a buck converter, and wherein the second stage open loop DC-DC converter comprises a switched-capacitor converter.
13. The power converter according to any one of the preceding items, wherein the first stage regulated DC-DC converter comprises a resonant converter, and wherein the second stage open loop DC-DC converter comprises a switched-capacitor converter.
14. The power converter according to any one of items 12 to 13, wherein the intermediate DC voltage is lower than the input DC voltage, and wherein the output DC voltage is lower than the intermediate DC voltage.
15. The power converter according to any one of the preceding items, wherein the first stage regulated DC-DC converter comprises a linear regulator, and wherein the second stage open loop DC-DC converter comprises switched-capacitor voltage multiplier.
16. The power converter according to any one of the preceding items, wherein the output DC voltage is higher than the input DC voltage.
17. The power converter according to item 16, wherein the output DC voltage is at least 2 times higher than the input DC voltage.
18. The power converter according to any one of the preceding items, wherein the first stage regulated DC-DC converter comprises a switched-mode converter, preferably a boost converter, and wherein the second stage open loop DC-DC converter comprises switched-capacitor voltage multiplier.
19. An electrical apparatus comprising:
   a power converter according to any one of the preceding items; and
   a load supplied by the power converter.
20. The electrical apparatus according to item 19, wherein the second stage open loop DC-DC converter is disposed closer to the load than the first stage regulated DC-DC converter.
21. The electrical apparatus according to any one of items 19 to 20, wherein the second stage open loop DC-DC converter is disposed in a load package comprising the load, or wherein the power converter and the load are disposed in a common package.
22. A method of converting an input DC voltage to an output DC voltage, the method comprising the steps of:
   providing a power converter comprising:
      a first stage regulated DC-DC converter adapted to receive an input DC power and generate an intermediate DC voltage;

a second stage open loop DC-DC converter adapted to receive the intermediate DC voltage from the first stage regulated DC-DC converter and generate an output DC voltage; and controlling the regulated DC-DC converter to adjust the intermediate DC voltage, thereby also adjusting the output DC voltage, based on measurements of the output DC voltage and a target output DC voltage.

23. The method according to item 22 using the power converter according to any one of items 1 to 18.

What is claimed is:

1. A power converter comprising:
a first stage regulated DC-DC converter configured to convert an input DC voltage to an intermediate DC voltage;
a second stage open-loop DC-DC converter comprising one or more sub-converters having a fixed voltage conversion ratio, the second stage open-loop DC-DC converter configured to convert the intermediate DC voltage to an output DC voltage or an output DC current to a load; and
a controller configured to control the regulated DC-DC converter to regulate the output DC voltage or the output DC current by adjusting the intermediate DC voltage, based on measurements of the output DC voltage or the output DC current and a target output DC voltage or a target output DC current.

2. The power converter according to claim 1, wherein the first stage regulated DC-DC converter is one of a linear regulator, a switched-mode converter, a switched-capacitor converter and a resonant converter.

3. The power converter according to claim 1, wherein the second stage open loop DC-DC converter is one of a switched-capacitor current multiplier and a switched-capacitor voltage multiplier.

4. The power converter according to claim 1, wherein the second stage open loop DC-DC converter is a solid-state DC-DC transformer.

5. The power converter according to claim 1, wherein the second stage open loop DC-DC converter is configured to deliver discrete multiples of the intermediate DC voltage to the output DC voltage or current.

6. The power converter according to claim 1, wherein the second stage open loop DC-DC converter comprises a plurality of parallel open loop DC-DC sub-converters.

7. The power converter according to claim 6, wherein the plurality of parallel open loop DC-DC sub-converters are configured to have the intermediate DC voltage as input, thereby being configured to provide a plurality of output DC voltages or a plurality of output DC currents.

8. The power converter according to claim 6, wherein the plurality of parallel open loop DC-DC sub-converters are parallel switched-capacitor converters.

9. The power converter according to claim 6, wherein the plurality of parallel open loop DC-DC sub-converters have the same or different conversion rates, and wherein the controller is configured to enable the open loop DC-DC sub-converters individually.

10. The power converter according to claim 1, wherein a second current density of the second stage open loop DC-DC converter is higher than a first current density of the first stage regulated DC-DC converter.

11. The power converter according to claim 1, wherein a second power efficiency of the second stage open loop DC-DC converter is higher than a first power efficiency of the first stage regulated DC-DC converter.

12. The power converter according to claim 1, wherein the first stage regulated DC-DC converter comprises a switched-mode converter, and wherein the second stage open loop DC-DC converter comprises a switched-capacitor converter.

13. The power converter according to claim 12 wherein the intermediate DC voltage is lower than the input DC voltage, and wherein the output DC voltage is lower than the intermediate DC voltage.

14. The power converter according to claim 1, wherein the first stage regulated DC-DC converter comprises a resonant converter, and wherein the second stage open loop DC-DC converter comprises a switched-capacitor converter.

15. The power converter according to claim 14, wherein the intermediate DC voltage is lower than the input DC voltage, and wherein the output DC voltage is lower than the intermediate DC voltage.

16. The power converter according to claim 1, wherein the first stage regulated DC-DC converter comprises a linear regulator, and wherein the second stage open loop DC-DC converter comprises switched-capacitor voltage multiplier.

17. The power converter according to claim 1, wherein the first stage regulated DC-DC converter comprises a switched-mode converter, and wherein the second stage open loop DC-DC converter comprises switched-capacitor voltage multiplier.

18. An electrical apparatus comprising:
a power converter comprising
a first stage regulated DC-DC converter configured to convert an input DC voltage to an intermediate DC voltage;
a second stage open-loop DC-DC converter comprising one or more sub-converters having a fixed voltage conversion ratio, the second stage open-loop DC-DC converter configured to convert the intermediate DC voltage to an output DC voltage or an output DC current to a load; and
a controller configured to control the regulated DC-DC converter to regulate the output DC voltage or the output DC current by adjusting the intermediate DC voltage, based on measurements of the output DC voltage or the output DC current and a target output DC voltage or a target output DC current; and
a load supplied by the power converter.

19. The electrical apparatus according to claim 18, wherein the second stage open loop DC-DC converter is disposed closer to the load than the first stage regulated DC-DC converter.

20. The electrical apparatus according to claim 18, wherein the second stage open loop DC-DC converter is disposed in a load package comprising the load, or wherein the power converter and the load are disposed in a common package.

21. A method of converting an input DC voltage to an output DC voltage, the method comprising the steps of:
providing a power converter comprising:
a first stage regulated DC-DC converter adapted to receive an input DC power and generate an intermediate DC voltage;
a second stage open loop DC-DC converter comprising one or more sub-converters having a fixed voltage conversion ratio, the second stage open-loop DC-DC converter adapted to receive the intermediate DC voltage from the first stage regulated DC-DC converter and generate an output DC voltage; and
controlling the regulated DC-DC converter to adjust the intermediate DC voltage, thereby also adjusting the output DC voltage, based on measurements of the output DC voltage and a target output DC voltage.

* * * * *